United States Patent
Gaben et al.

(10) Patent No.: US 10,340,555 B2
(45) Date of Patent: Jul. 2, 2019

(54) METHOD FOR THE PRODUCTION OF THIN-FILM LITHIUM-ION MICROBATTERIES AND RESULTING MICROBATTERIES

(71) Applicant: I-TEN, Champagne-au-Mont-d'Or (FR)

(72) Inventors: Fabien Gaben, Ecully (FR); Frédéric Bouyer, Perrigny les Dijon (FR); Bruno Vuillemin, Darbonnay (FR)

(73) Assignee: I-TEN, Champagne-au-Mont-d'Or (FR)

(*) Notice: Subject to any disclaimer, the term of this patent is extended or adjusted under 35 U.S.C. 154(b) by 413 days.

(21) Appl. No.: 14/355,170

(22) PCT Filed: Oct. 30, 2012

(86) PCT No.: PCT/FR2012/052505
§ 371 (c)(1),
(2) Date: Apr. 29, 2014

(87) PCT Pub. No.: WO2013/064777
PCT Pub. Date: May 10, 2013

(65) Prior Publication Data
US 2014/0308570 A1    Oct. 16, 2014

(30) Foreign Application Priority Data
Nov. 2, 2011  (FR) ...................... 11 59898

(51) Int. Cl.
*H01M 10/0585*   (2010.01)
*H01M 4/04*   (2006.01)
(Continued)

(52) U.S. Cl.
CPC ........ *H01M 10/0585* (2013.01); *C25D 13/02* (2013.01); *C25D 13/12* (2013.01);
(Continued)

(58) Field of Classification Search
CPC ...... H01M 4/04; H01M 4/0402; H01M 4/043; H01M 4/1391; H01M 10/0525;
(Continued)

(56) References Cited

U.S. PATENT DOCUMENTS

2005/0272214 A1* 12/2005 Chiang ................. G02F 1/1523
                                                                          438/309
2011/0100532 A1*  5/2011 Lee ........................ C25D 13/02
                                                                          156/150

FOREIGN PATENT DOCUMENTS

| EP | 1295968 A1 | 3/2003 |
| JP | 2002 042790 A | 2/2002 |
| JP | 2002 042792 A | 2/2002 |

OTHER PUBLICATIONS

Ferrari et al, "EPD of thick films for their application in lithium batteries", Journal of the European Ceramic Society, Jan. 1, 2007, pp. 3823-3827, vol. 27 No. 13-15, Elsevier Science Publishers, Great Britain.

* cited by examiner

*Primary Examiner* — Gary D Harris
(74) *Attorney, Agent, or Firm* — Jordan IP Law, LLC; Todd A. Vaughn

(57) ABSTRACT

Process for fabrication of all-solid-state thin film batteries, said batteries comprising a film of anode materials (anode film), a film of solid electrolyte materials (electrolyte film) and a film of cathode materials (cathode film) in electrical contact with a cathode collector, characterized in that:
  a first electrode film (cathode or anode) is deposited by electrophoresis on a conducting substrate or a substrate with at least one conducting zone, said substrate or said at least one conducting zone possibly being used as a collector of said electrode current (anode or cathode current) of the micro-battery,
(Continued)

the electrolyte film is deposited by electrophoresis on said first electrode film, a second electrode film (anode or cathode) is deposited on the electrolyte film either by electrophoresis or by a vacuum deposition process.

11 Claims, 6 Drawing Sheets

(51) Int. Cl.
- *H01M 4/1391* (2010.01)
- *H01M 10/0525* (2010.01)
- *C25D 13/02* (2006.01)
- *C25D 13/12* (2006.01)
- *C25D 13/22* (2006.01)

(52) U.S. Cl.
CPC .............. *C25D 13/22* (2013.01); *H01M 4/04* (2013.01); *H01M 4/0402* (2013.01); *H01M 4/043* (2013.01); *H01M 4/1391* (2013.01); *H01M 10/0525* (2013.01)

(58) Field of Classification Search
CPC ... H01M 10/0585; C25D 13/12; C25D 13/22; C25D 13/02; Y02P 70/54; Y02E 60/122
USPC ........................................................ 429/162
See application file for complete search history.

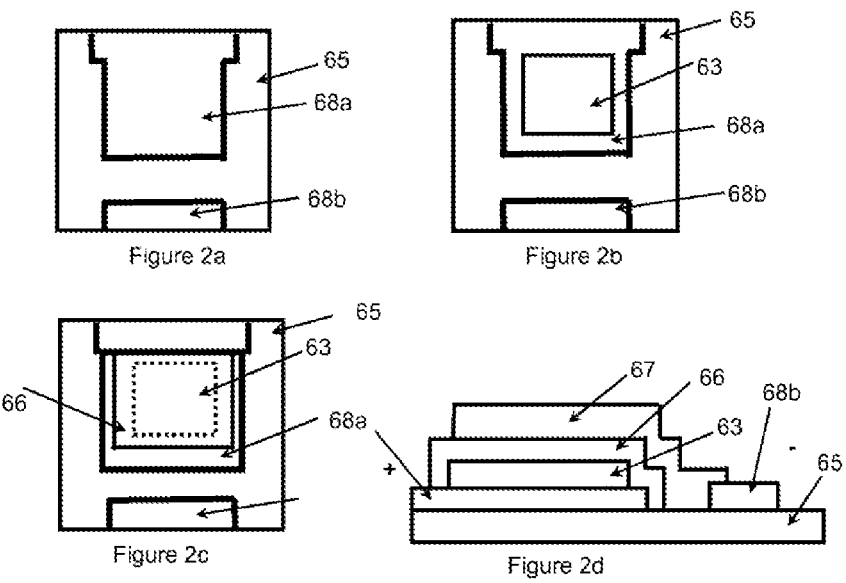
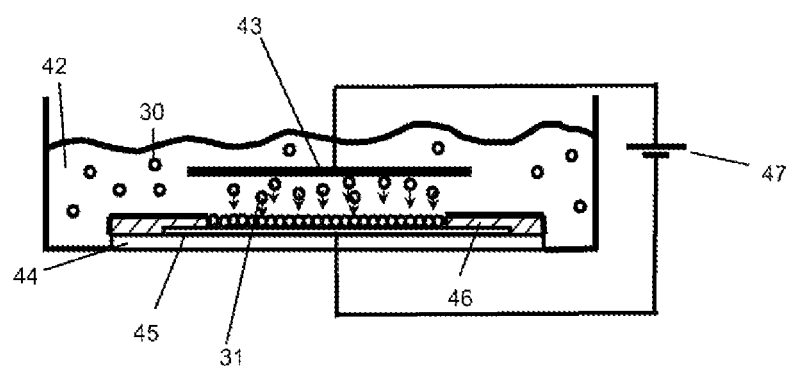
Figure 3

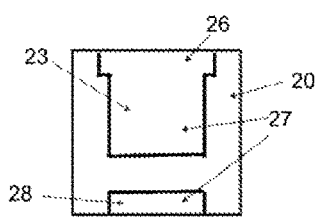
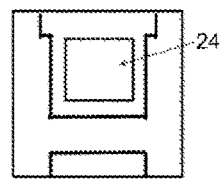
Figure 5a        Figure 5b
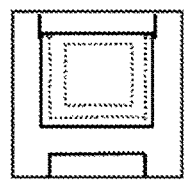
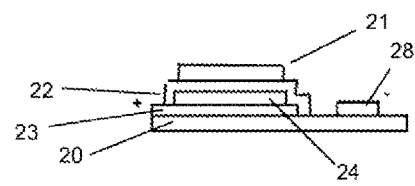
Figure 5c        Figure 5d
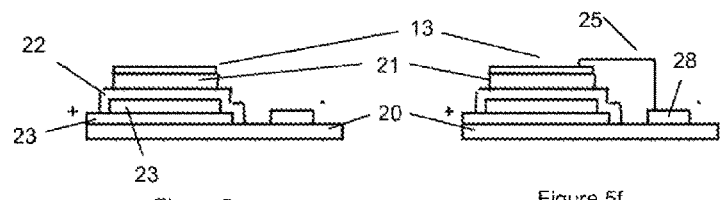
Figure 5e        Figure 5f
Figure 5

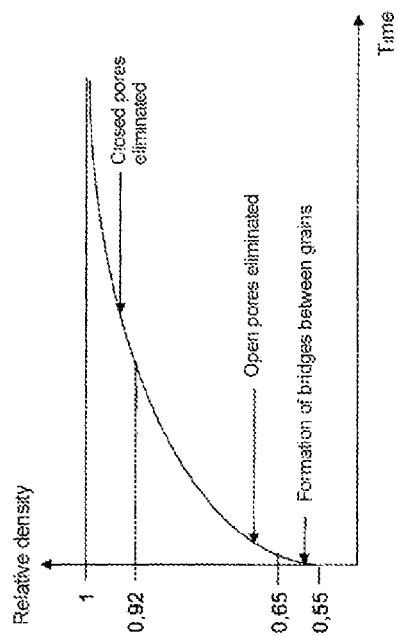
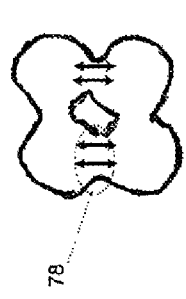
Figure 6b
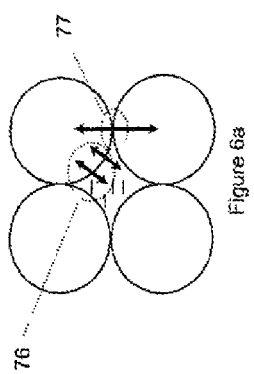
Figure 6a
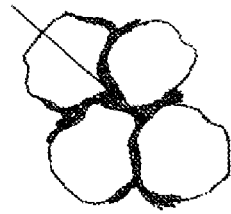
Figure 6c

METHOD FOR THE PRODUCTION OF THIN-FILM LITHIUM-ION MICROBATTERIES AND RESULTING MICROBATTERIES

FIELD OF THE INVENTION

This invention relates to the field of batteries and particularly micro-batteries. It most particularly concerns all-solid-state lithium ion micro-batteries and a new process for making such thin-film micro-batteries.

STATE OF THE ART

Recently, the use of micro-fabrication techniques has made it possible to make micrometric-sized sensors. These sensors are used in networks to detect and monitor events or parameters over large spaces. The power supply to these sensors distributed in networks is only possible through wire connections, therefore many developments have been made to make completely standalone versions of these sensors. These sensors are equipped with onboard power and energy sources so that they can operate for 10 to 20 years.

Although these micro-sensors have been existing for many years, micro energy storage sources are still in the development stage and the first prototypes are beginning to appear on the market. In sensors, these micro-batteries are associated with energy production devices. Mini-photovoltaic cells, thermoelectric and piezoelectric generators are short of power, such that they have to be associated with micro-batteries that provide an energy and power reserve so that the sensor can operate.

The size of the micro-batteries must be similar to the size of electronic components, and therefore conventional battery fabrication techniques for example like those used to make button cells, can no longer be used. These conventional fabrication techniques cannot be used to make sub-millimetric sized devices, and the reduction in volume, the miniaturization of button cells, result in an exponential reduction in their energy density.

As for the power supply to standalone sensors, there are many other applications for which the production of very thin micro-batteries would be useful. This is the case mainly for the development of so-called smart cards and RFID labels.

Furthermore, all "power back up" applications that up to now used button cells, can advantageously use rechargeable micro-batteries for this purpose, thus reducing the size of the energy storage device.

Different vacuum deposition techniques have been used for the fabrication of thin-film micro-batteries. In particular, PVD deposition is the most frequently used technique for fabrication of these thin film micro-batteries. The lack of a solvent or polymer-based electrolyte in these batteries gives them the temperature resistance required for wave soldering assembly techniques on electronic boards. This lack of an organic electrolyte makes it necessary to make thin films with no pores and no other isolated defects to guarantee low electrical resistivity and good ion conduction necessary for these devices to work correctly.

The production of such pore-free micro-batteries with dense thin films provides them with an excellent energy and power density, that nevertheless remain dependent on the electrode thickness.

However, vacuum deposition techniques used to make such films are very expensive and difficult to implement industrially over large areas, with high productivity.

These techniques also make it necessary to work on a substrate, often based on silica, which tends to reduce the energy and power density of the battery when it is very small.

It is also necessary to use expensive deposition stencils, and raw materials are not used efficiently. Vacuum sputtered materials are also deposited on masks and on reactor walls.

Other technologies currently available for making thin films include embodiments based on consolidation of compact particle deposits. These techniques include the production of deposits by sol-gel processes. This technique consists of depositing a polymeric lattice on the surface of a substrate obtained after hydrolysis, polymerization and condensation steps. The sol-gel transition appears during evaporation of the solvent that accelerates reactional processes on the surface. This technique can be used to make compact and very thin deposits. The films thus obtained are of the order of a hundred nanometers thick, which is not sufficient to provide a battery with a sufficient endurance.

Successive steps should be performed to increase the thickness of the deposit without inducing risks of cracks or crazing occurring. Consequently, this technique creates industrial productivity problems as soon as an attempt is made to increase the thickness of the deposit.

Inking techniques are capable of making deposits a few microns thick. However, this requires a fluid ink. The fluidity of inks depends on the content of dry extracts, particle sizes and the nature of the solvent and any organic compounds dissolved in this ink. The viscosity of inks increases as the concentration of particles increases, or for a given dry extract, as the particle size reduces. Furthermore, an increase in the solvent quantity increases risks of forming cracks, cavities and clusters in the deposit during the drying phases. The deposits then become very difficult to compact. Final compaction of the deposit is obtained by evaporation of the solvent contained in the ink. This drying step is difficult to control because regions with lower densities will dry faster than areas with higher densities. Capillary effects induced by these local differences in drying will cause zones with higher densities that are still impregnated to group together. After drying, this leads to the formation of cavities and clusters. The only way to eliminate these defects due to compaction is compaction under very high pressures (with the required pressure increasing as the particle size reduces) and/or sintering at high temperatures close to the melting temperature of the material forming the particles.

Very high temperatures are thus necessary to consolidate the initially porous structure. Temperature rises are difficult to control if it is required that shrinkage accompanying infilling of these pores in the thickness of the deposit does not lead to cracks. Furthermore, not all substrates resist such temperatures, and also the thickness of the deposit cannot be precisely controlled using the current liquid phase deposition techniques disclosed above.

As for vacuum deposition techniques, the production of local deposits with a good spatial resolution makes it necessary to use deposition stencils. Inks are then coated on the substrate covered with this stencil and inks are deposited both on the substrate and on the surface of the stencil that was used to locally mask the substrate.

Finally, there is another alternative for deposition of materials in thin films in electrochemical devices and particularly in batteries. This is an electrophoretic particle deposition. For example, patent application U.S. Pat. No. 7,662,265 (Massachusetts Institute of Technology) discloses the fabrication of thin film electrochemical devices (including batteries) by electrophoresis in which one of the electrodes (anode or cathode) and the solid electrolyte are obtained simultaneously, the other electrode having already been formed prior to electrophoretic deposition. Many cathode materials are mentioned, particularly $LiCoO_2$, and $LiFePO_4$, and the solid electrolytes mentioned are polymer electrolytes.

U.S. Pat. No. 6,887,361 (University of California) discloses a process to form a ceramic coating on an electrochemical device substrate in the solid state. Deposition is made by electrophoresis of a suspension of ceramic particles in isopropylic alcohol followed by drying and sintering. The process is applicable essentially to solid oxide fuel cells (SOFC).

Patent applications US 2007/184345, WO 2007/061928, US 2008/286651 and WO 2010/011569 (Infinite Power Solutions) disclose electrochemical devices comprising a cathode deposited by techniques other than vacuum deposition; in particular they disclose deposition of a cathode film by electrophoresis from a micronic sized powder of $LiCoO_2$; however, this film comprises cavities and it must be consolidated by sintering at high temperature. Other parts of the battery are obtained by vacuum deposition.

U.S. Pat. No. 7,790,967 (3G Solar Ltd) discloses the deposition of a nanoporous electrode made of $TiO_2$ by electrophoresis starting from a suspension of $TiO_2$ nanoparticles. The electrode thickness is of the order of 10 μm.

Some documents describe the use of electrophoresis for making some parts of thin film batteries; electrophoresis as described in these documents leads to porous films.

Patent JP 4501247 (DENSO) discloses a process for fabrication of an electrode for a battery in which a film of an active material is formed by electrophoresis. More specifically, this patent discloses a process in which a charge collector is dipped in a solution comprising an active material in a solvent, this process being part of a more general process for fabrication of an electrode for a battery. Electrophoresis of said active material contained in the solution is done by generating an electric potential gradient in this solution, the active material forming a film of active material on the surface of the collector and bonding to said collector surface. Fabrication of porous cathodes for Li-ion batteries using this process is mentioned. Techniques used to make the anode and the electrolyte are not mentioned.

Patent application JP 2002-042792 (DENSO) discloses a process for depositing a solid electrolyte on an electrode of a battery, the deposit being made by electrophoresis. No consolidation is done after the deposition; the deposit is porous. The electrolytes considered are essentially polymer electrolytes and lithium iodide.

PURPOSES OF THE INVENTION

A first purpose of this invention is the fabrication of all-solid-state thin film batteries with films that have excellent geometric precision, particularly precisely-controlled thickness and a very small number of defects, using a process providing a high deposition rate with low investment and operating costs.

Another purpose of the invention is to fabricate thin film batteries using a process that is easily implemented industrially and that causes little pollution.

Another purpose of the invention is to disclose a very simple process for making thin films with various chemical compositions.

Another purpose is to fabricate batteries with a better power density and a better energy density.

Yet, another purpose is to fabricate longer life batteries that can resist exposure to high temperatures without deteriorating.

Yet another purpose is to fabricate rechargeable batteries.

Yet another purpose is to fabricate thin batteries, the thickness of which does not exceed a few tens or even a few hundred micrometers, and that can be integrated onto electronic boards, smart cards, RFID labels and other small and/or flexible devices.

These objectives are achieved using a process for fabrication of all-solid-state thin film batteries, said batteries comprising a film of anode materials (anode film) in electrical contact with an anode collector, a film of solid electrolyte materials (electrolyte film) and a film of cathode materials (cathode film) in electrical contact with a cathode collector, in which process a first electrode film (cathode or anode) is deposited by electrophoresis on a conducting zone of a substrate, said substrate or its conducting elements can be used as a collector of said battery electrode (anode or cathode); the electrolyte film is deposited by electrophoresis on said first electrode film; a second electrode film (anode or cathode) is deposited on the electrolyte film either by electrophoresis or by another process, such as a vacuum deposition process.

Said process also comprises a so-called consolidation step of the films deposited by electrophoresis or several so-called consolidation steps made successively after each deposition of films by electrophoresis. These consolidation steps have the effect of increasing the density of films deposited by electrophoresis. The consolidation(s) may be done after deposition of the cathode film and/or deposition of the electrolyte film, and/or after deposition of the anode film. It is preferable if it (they) is (are) done after the deposition of the cathode film and/or after the deposition of the electrolyte film, if the anode film is deposited using a technique other than electrophoresis, or after the deposition of the anode film if the anode is film is deposited by electrophoresis.

Said consolidation is possible using a mechanical process, for example by passing between two rollers, by pressing (preferably isostatic) or by shock, or by heat treatment, or by a combination of these processes.

In one embodiment, the thermal consolidation step and possibly also the mechanical consolidation step is (are) done under a vacuum or under an inert gas.

Thermal consolidation may be preceded or accompanied by one or several mechanical consolidation steps.

In one advantageous embodiment, said consolidation step is done at a temperature $T_R$ that preferably does not exceed 0.7 times the melting or decomposition temperature (expressed in ° C.), and preferably does not exceed 0.5 times (and even more preferably does not exceed 0.3 times) the melting or decomposition temperature (expressed in ° C.) of:
  the material deposited by electrophoresis when it is required to consolidate a single film,
  the material with the lowest melting temperature co-deposited by electrophoresis, when it is required to consolidate a film containing particles with different chemical compositions,
  materials in the film with the highest melting temperature when several films have to be consolidated simultaneously.

In any case, it is advantageous to not exceed 600° C., and it is preferable to not exceed 500° C. or even 400° C.

More particularly, the process for fabrication of all-solid-state thin film batteries according to the invention includes steps to:

(a) Provide a first colloidal suspension "SP+" containing "P+" particles, called a "cathode materials" suspension;
(b) Provide a second colloidal suspension "SPn" containing "Pn" particles, called "solid electrolyte materials" suspension;
(c) Provide an insulating substrate completely or partially coated with conducting surfaces;
(d) Immerse the substrate, possibly locally masked by an insulating stencil, in a bath of said SP+ suspension containing P+ particles of cathode materials in the presence of a counter electrode, followed by application of an electric voltage between said substrate and said counter electrode so as to obtain an electrophoretic deposit containing P+ particles of cathode materials on said substrate to obtain a first BP+ intermediate product;
(e) Immerse said first BP+ intermediate product, that can be locally masked by an insulating stencil, in a bath of said SPn suspension of Pn particles of electrolyte materials in the presence of a counter electrode, followed by application of an electric voltage between said substrate and said counter electrode so as to obtain an electrophoretic deposit of Pn particles of electrolyte materials on the surface of the cathode film of said BP+ intermediate product, thus obtaining a second BP+Pn intermediate product;
(f) Deposit an anode film on the electrolyte film of said second BP+Pn intermediate product, that can be locally masked by a stencil, either by vacuum deposition or by electrophoresis starting from a third "SP−" colloidal suspension containing "P−" particles, called an "anode materials" suspension, to obtain a third BP+PnP− intermediate product.

The next step is to deposit an anode current collector film on the anode film of said third BP+PnP− intermediate product to terminate the micro-battery.

When a lithium or metallic lithium alloy anode is deposited as the anode, this anode can also be used as a current collector and can make the connection to a termination previously deposited on the substrate.

Advantageously, said P+ and/or P− and/or Pn particles are nanoparticles.

The substrate may be an insulator with metalized zones. These metallizations can be used as current collectors or as electrical terminations.

In one embodiment, deposition by electrophoresis is preferably done with a colloidal suspension of particles smaller than 1 μm, preferably smaller than 100 nm, or even smaller than 30 nm. The use of nanoparticles, preferably smaller than 100 nm and even more preferably less than 30 nm, can give thin films with an excellent density after consolidation. This density advantageously reaches 85%, and preferably 90%, and even more preferably 95% of the theoretical density of the solid substance.

Advantageously, the porosity of at least one of the films after consolidation is less than 15%, preferably less than 10% and even more preferably less than 5%.

In the process according to the invention, the average size $D_{50}$ of nanoparticles in the anode, cathode and/or solid electrolyte material is preferably less than 1 μm, more preferably less than 100 nm, but it is even more preferable if the nanoparticles are smaller than 50 nm and even more preferable if they are smaller than 30 nm. This makes it possible to consolidate thin films thermally at a lower temperature. This is why approximately spherical or cubic-shaped particles are preferred.

The average grain size in at least one of the anode, cathode and/or electrolyte films after thermal consolidation is less than 1 μm; this increases the life of the battery, probably because the local unbalance of the battery reduces. The heat treatment duration should be appropriate to prevent the risk of excessive ("parasitic") growth of some grains.

Another purpose of the invention is to obtain highly compact films after the deposition by electrophoresis, free particularly of cavities, cracks and clusters in order to facilitate consolidation at low temperature.

In some embodiments, the zeta potential of procured SP+, SP− and/or SPn colloidal suspensions in steps (a), (b) and (c) is more than 40 mV, or even more than 60 mV, to obtain stable suspensions not containing any particle clusters that could lead to defects in the deposited films. These suspensions can contain a steric or preferably electrostatic stabilizer.

The electrophoretic deposition of nanoparticles can be facilitated by means of a step to deposit a compound designed to reduce the Zeta potential on conducting bands prior to the particle deposition step, before the deposition of the P+, P− and/or Pn particles.

Another purpose of the invention is the deposition of thin films with a very wide variety of chemical compositions that can associate several phases in order to increase functions of the deposits. This purpose is achieved through the use of the electrophoresis technique that makes it easy to deposit films using suspensions of particle mixes.

Another purpose of the invention is to be able to very precisely control deposited thicknesses (within a thickness range varying from a few hundred nanometers to a few tens or even about a hundred micrometers). More precisely, it is required to have a process that guarantees perfect uniformity of the thickness over the entire surface of the deposit, and excellent reproducibility and repeatability at industrial scale.

Yet another purpose is to achieve optimum economy of the raw material.

These objectives are achieved by use of electrophoresis for preparation of the cathode film, the electrolyte film, and advantageously also the anode film, and by precise control of the deposition current throughout the deposition by electrophoresis. In one advantageous embodiment, the thickness of the anode and/or cathode film after consolidation is less than 20 μm, more preferably less than 10 μm and even more preferably less than 5 μm.

Yet another purpose is to disclose a new easy-to-prepare thin film micro-battery on a rigid or flexible substrate, with excellent reliability, long life and low self-discharge, that can be recharged and has very high energy storage densities. This purpose is achieved by an all-solid-state thin film micro-battery fabricated by any one of the embodiments and variants of the process described above, comprising a successive stack of films consisting of a cathode electrode film deposited on a cathode current collector, an electrolyte film, an anode electrode film that will be directly or indirectly connected to an anode current collector. Preferably, at least one of said cathode electrode, electrolyte and anode electrolyte films, and preferably all three of the films, have a porosity of less than 20%, preferably less than 10% and even more preferably less than 5%.

DESCRIPTION OF THE FIGURES

FIG. 1(a) diagrammatically shows a compact deposition of particles 2 on a substrate 1. All particles 2 are in contact with their adjacent particles 2a, 2b, 2c, 2d. There are pores 3 between the particles 2.

FIG. 1(e) shows a dense deposit 4 as can be obtained using PVD type techniques; the porosity of these dense deposits is close to 0% because they are not formed by stacking particles.

FIG. 2 show one embodiment of the invention. FIGS. 2a, 2b, 2c, 2d show products obtained at different steps in another particular embodiment of the process according to the invention, in which the substrate on which the electrodes are deposited is an insulating substrate plate comprising metalized zones. In this embodiment, the anode is a lithium film deposited under vacuum that will also be used as a current collector connected to a negative termination, previously deposited on the substrate.

FIG. 3 shows the deposition process by electrophoresis through an insulating stencil.

Figure 4:
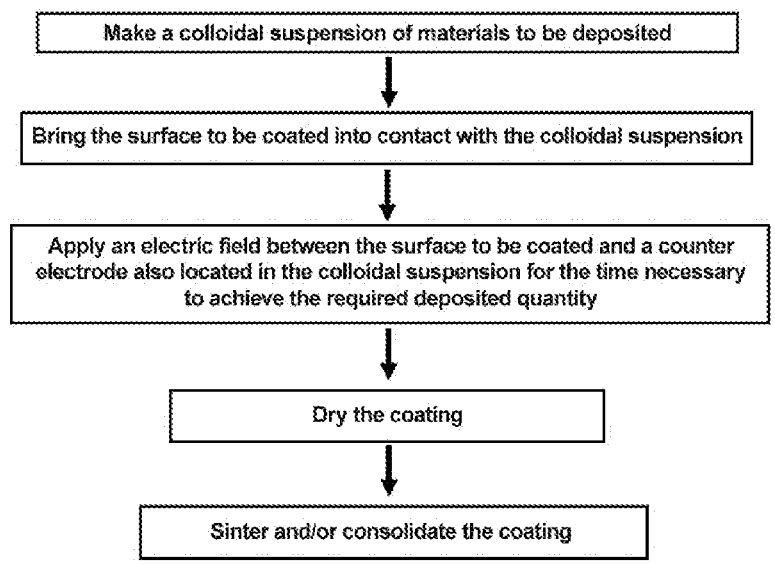

The diagram in FIG. 4 shows a typical embodiment of the process according to the invention:

FIGS. 5 show another typical embodiment of the process according to the invention.

FIGS. 6a, 6b, 6c and 6d show lithium diffusion paths in different particle assembly configurations.

Figure 7A:
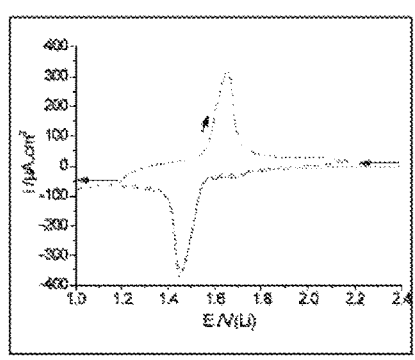

FIG. 7a is a voltammetry curve for a suspension of LTO particles with a dry extract of 10 g/L.

Figure 7B:
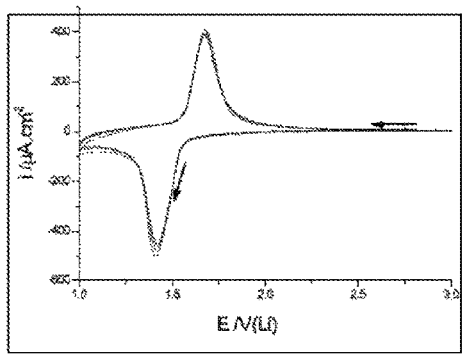

FIG. 7b is a voltammetry curve for a suspension of LTO particles with a dry extract of 2 g/L, containing a few ppm of citric acid.

Figure 8:
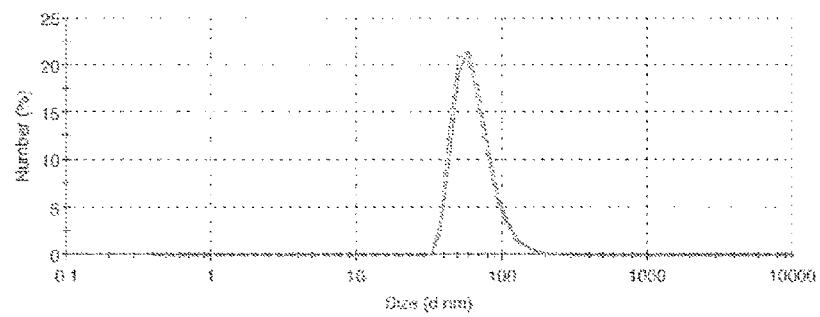

FIG. 8 is a DLS diagram showing the distribution of the size of ($Li_{1.3}Al_{0.3}Ti_{1.7}(PO_4)_3$) electrolyte particles in suspension.

MARKS USED ON THE FIGURES

| | |
|---|---|
| 1 | Substrate |
| 2, 2a, 2b, 2c, 2d | Particles |
| 3 | Pore |
| 4 | Film obtained by PVD deposition |
| 5 | Cluster |
| 6 | Cavity |
| 7 | Open crack |
| 8 | Non-open crack |
| 13 | Anode collector |
| 20 | Substrate |
| 21 | Anode |
| 22 | Electrolyte |
| 23 | Metal film |
| 24 | Cathode |
| 25 | Connection wire |
| 26 | Cathode collector |
| 27 | Metalized surfaces |
| 28 | Anode electrical termination |
| 30 | Particle charged on surface |
| 31 | Nanoparticle moving under the influence of the electric field |
| 42 | Colloidal suspension |
| 43 | Counter electrode |
| 44 | Substrate |
| 45 | Metallic surface on the substrate |
| 46 | Stencil |
| 47 | Voltage source |
| 63 | Cathode film |
| 65 | Insulating substrate |
| 66 | Electrolyte film |
| 67 | Anode film |
| 68a, 68b | Metal films on insulating substrate 65 |
| 76 | Surface contact zone between particles and the electrolyte contained in pores (low resistance diffusion path) |
| 77 | Point contact zone between particles (diffusion of lithium being limited on this point contact) |
| 78 | Welding of particles during consolidation that led to the development of diffusion paths in the solid, for transport of electrical charges (electrons and ions) |
| 79 | Phase with lowest melting temperature that consolidated particles to each other |

DETAILED DESCRIPTION OF THE INVENTION

For the purposes of this invention, "electrophoretic deposition" or "deposition by electrophoresis" refers to a film deposited by a process for deposition of electrically charged particles previously put into suspension in a liquid medium onto a surface of a conducting substrate, displacement of particles towards the surface of the substrate being generated by application of an electric field between two electrodes placed in the suspension, one of the electrodes forming the conducting substrate on which the deposit is made, the other electrode (counter electrode) being located in the liquid phase. A compact deposit of particles thus forms on the substrate if the zeta potential has an appropriate value as will be explained below.

In the context of this document, the particle size refers to its largest dimension. Thus, a "nanoparticle" is a particle for which at least one of its dimensions is smaller than 100 nm. The "particle size" or "average particle size" of a powder or a set of particles is given by $D_{50}$.

The "zeta potential" of a suspension is defined as being the difference in potential between the heart of the solution and the shear plane of the particle. It is representative of the stability of a suspension. The shear plane (or hydrodynamic radius) corresponds to an imaginary sphere around the particle in which the solvent moves with the particle when the particles move in the solution. The theoretical basis and the determination of the zeta potential are known to the electrochemist who develops depositions by electrophoresis; it can be deduced from the electrophoretic mobility. There are several marketed techniques and devices for making a direct measurement of the zeta potential. When the dry extract is small, the zeta potential can be measured using a Zetasizer Nano ZS type equipment made by the Malvern Company. This equipment uses optical devices to measure particle displacement speeds as a function of the electric field applied to them. The solution also has to be highly diluted to enable the passage of light. When the quantity of dry extract is large, the zeta potential can be measured using acoustophoresis techniques, for example using a device called "acoustosizer" made by the Colloidal Dynamics Company. The particle speed is then measured by acoustic techniques.

"Dispersant" refers to a compound capable of stabilizing the colloidal suspension and particularly preventing particles from agglomerating.

The term micro-battery used herein refers not to the total size of the device but rather to its thickness. A lithium ion micro-battery is always micrometric, but it may be much longer and wider depending on the needs of the device that it powers, for example several millimeters or even several centimeters.

The process according to the invention comprises essential electrophoretic deposition steps of particles of cathode, anode and solid electrolyte materials. Such a process can significantly reduce the quantity of defects in films obtained in comparison with quantities obtained with known processes, particularly large pores, cavities, crazing and clusters; the quality of deposited films is better when the suspension from which the deposition is made is sufficiently stable.

The process according to the invention can be used to deposit thin films of electrodes and/or electrolyte. The thickness of these films is usually less than about 20 μm, preferably less than about 10 μm, and even more preferably less than 5 μm.

The process for fabrication of all-solid-state thin film batteries according to this invention has an advantageous alternative to known techniques and particularly to PVD deposition techniques, in that it can be used to make very dense depositions at low temperature on large substrate areas with high deposition rates, easily and very precisely controllable thicknesses (depending on the size of the particles) over a wide thickness range varying from a tenth of a micron to several tens or even hundreds of microns without requiring very expensive investment in complex and not very productive machines.

Figure 1:
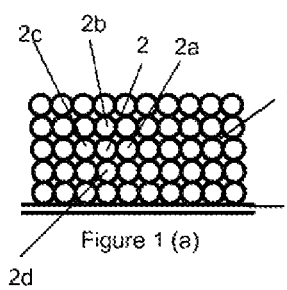
FIGS. 1(a), (b), (c) and (d) diagrammatically show films formed by stacking approximately isotropic shaped particles.
FIG. 1(e) shows a film deposited on a substrate using the PVD technique.
FIG. 1(b) diagrammatically shows a compact deposition of particles 2 as can be obtained using the process according to the invention.
FIG. 1(c) shows a deposit of particles 2 on a substrate, the deposit having defects. These defects are essentially cavities 6 related to the presence of clusters 5; therefore these cavities 6 form inter-cluster pores, unlike the intra-cluster pores 3 that are at a much smaller geometric scale. In the case of a deposition using the process according to the invention, these clusters 5 are formed when the suspension used is not sufficiently stable.
FIG. 1(d) shows a deposit of particles with cracks that appeared after drying; these cracks may be open (through) cracks 7 or internal (non-through) cracks 8.
Figure 1:
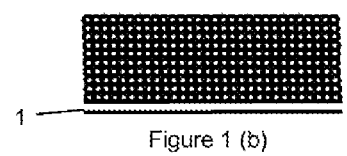
Figure 1:
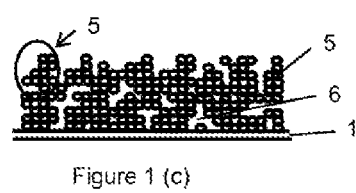
Figure 1:
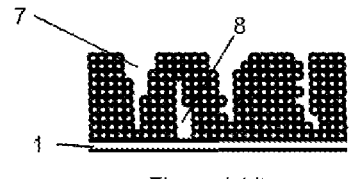
Figure 1:
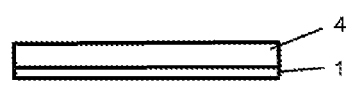

FIGS. 1a to 1c show the differences between intra-cluster pores 3 between particles 2 that will be referred to in this document as "pores", and inter-cluster pores 6 between clusters 5 and that will be referred to as "cavities" 6.

A compact deposit is a deposit without any cavities or cracks. On the other hand, it does have porosity in a ratio expressed as a percentage and calculated as follows:

Porosity [%]=[(density of the solid-state material−real density)/real density]×100 knowing that the "real density" is the density measured on the deposited film and the density of the solid-state material is the solid density of the deposited material, ignoring the presence of particles that create porosity when stacked.

The following describes each step in the process according to the invention.

Preparation of Suspensions

Deposition is preferably done from very stable SP+, SP−, SPn colloidal suspensions so as to obtain a deposit with a perfectly uniform thickness with no roughness, few defects and as compact as possible after the electrophoretic deposition process. The stability of suspensions depends on the size of the P+, P−, Pn, particles and the nature of the solvent used and the stabilizer that was used to stabilize the colloidal suspension. Procurement of these colloidal suspensions corresponds to steps (a), (b) and (c) in a main embodiment of the process according to the invention.

"SP+" refers to a colloidal suspension of "P+" particles of materials used to obtain a cathode film, "SP−" refers to a colloidal suspension containing P− particles of materials used to obtain an anode film, "SPn" refers to a colloidal suspension of "Pn" particles of materials used to obtain an electrolyte film.

Colloidal suspensions containing nanometric sized particles are preferred to facilitate subsequent consolidation of the deposit if necessary and to assure that thin film deposits can be made with very precise thicknesses and profiles (roughness). The average size $D_{50}$ of these particles is preferably less than 100 nm, and more preferably (especially in the case in which the suspension comprises particles of materials with high melting points) less than 30 nm. Consolidation of a deposit with small particles is very much facilitated if the deposit is compact. Particles with a parallelepiped shape may also be used.

Making electrophoretic depositions from stable colloidal suspensions avoids the formation of pores, cavities and clusters that are prejudicial to consolidation of the deposit. Furthermore with this technique, it is possible to have deposits with excellent compactness without necessarily making use of mechanical pressing and unbinding, regardless of the size of the deposited particles.

This high compaction of the deposit is obtained although the suspensions are highly diluted, with low contents of dry extracts.

The stability of suspensions can be expressed by their zeta potential. In the context of this invention, the suspension is considered to be stable when its zeta potential is more than 40 mV, and very stable when it is more than 60 mV. On the other hand, particle clusters can develop when the zeta potential is less than 20 mV. Thus, depositions are preferably done from colloidal suspensions with a zeta potential of more than 40 mV, and even more preferably 60 mV (absolute value) to guarantee good compaction of the thin film.

Colloidal suspensions that will be used in electrophoresis comprise an electric insulating solvent that may be an organic solvent, or demineralized water, or a mix of solvents, and particles to be deposited; colloidal suspensions may also comprise one or several stabilizers.

In a stable suspension, the particles do not agglomerate with each other to create clusters that could induce cavities, clusters and/or important defects in the deposit. Particles remain isolated in the suspension. Also in one embodiment of this invention, the stability of the suspension necessary to obtain a compact deposit is obtained through the addition of stabilizers.

The stabilizer avoids flocculation of powders and the formation of clusters. It can act electrostatically or sterically. Electrostatic stabilization is based on electrostatic interactions between charges and is obtained by the distribution of charged species (ions) in the solution. Electrostatic stabilization is controlled by the ion concentration; consequently, it may depend on the pH. Steric stabilization uses non-ionic surfactant polymers or even proteins which, when added to the suspension, are absorbed at the surface of particles to cause repulsion by congestion of the inter-particle space. A combination of the two stabilization mechanisms is also possible. Electrostatic stabilization is preferred for the purposes of this invention because it is easy to implement, reversible, inexpensive and facilitates subsequent consolidation processes.

However, the inventors have observed that with nanoparticles of the battery materials used for this invention, stable colloidal suspensions of particles can be obtained of particles that do not form clusters among themselves and/or of clusters of a few particles, without the addition of stabilizers. Particles and/or clusters are preferably smaller than 100 nm, and even more preferably smaller than 50 nm.

These suspensions were obtained for low quantities of dry extracts between 2 g/L and 20 g/L, preferably between 3 and 10 g/L, and more particularly for dry extracts of the order of 4 g/l in alcohol and/or ketone type organic solvent. These stable colloidal suspensions of monodispersed particles without added stabilizers are especially preferred for this invention.

The Zeta potential of such suspensions is usually less than 40 mV, and more particularly between 25 and 40 mV. This could mean that such suspensions tend to be unstable, however the inventors have observed that the use of these suspensions for an electrophoretic deposition leads to very good quality deposited films.

With this type of suspension, the nanoparticles are negatively charged, therefore they are compatible with anaphoretic depositions. The addition of stabilizers or cations to the suspension to modify the surface charge of nanoparticles to make them compatible with cataphoretic polarizations could lead to deposits being polluted. Organic stabilizers with low volatility could electrically isolate the nanoparticles thus preventing any electrochemical response.

Deposition voltages of less than 5 V must be preferred when the solvent used is water. At above 5 V, water can be electrolyzed causing gas production on electrodes that make deposits porous and reduce their bond onto the substrate. Galvanic reactions in an aqueous medium also cause the formation of metal cations that can pollute deposits.

In one preferred embodiment, depositions are made in a solvented phase. It is thus possible to work at much higher voltages, thus increasing deposition rates.

According to the invention, the nanoparticles used to make the cathode thin film are preferably chosen from among one or several of the following materials:
 (i) $LiMn_2O_4$, $LiCoO_2$, $LiNiO_2$, $LiMn_{1.5}Ni_{0.5}O_4$, $LiMn_{1.5}Ni_{0.5-x}X_xO_4$ oxides (where x is selected from among Al, Fe, Cr, Co, Rh, Nd, other rare earths and in which $0<x<0.1$), $LiFeO_2$, $LiMn_{1/3}Ni_{1/3}Co_{1/3}O_4$;
 (ii) $LiFePO_4$, $LiMnPO_4$, $LiCoPO_4$, $LiNiPO_4$, $Li_3V_2(PO_4)_3$ phosphates;
 (iii) all lithium forms of the following chalcogenides: $V_2O_5$, $V_3O_8$, $TiS_2$, $TiO_yS_z$, $WO_yS_z$, $CuS$, $CuS_2$.

According to the invention, the nanoparticles used to make the anode thin film by electrophoresis are preferably chosen from among one or several of the following materials:
 (i) tin oxinitrides (typical formula $SnO_xN_y$);
 (ii) mixed silicon and tin oxinitrides (typical formula $Si_aSn_bO_yN_z$ where $a>0$, $b>0$, $a+b\leq2$, $0<y\leq4$. $0<z\leq3$) (also called SiTON), and particularly $SiSn_{0.87}O_{1.2}N_{1.72}$; and oxinitrides in the form $Si_aSn_bC_cO_yN_z$ where $a>0$, $b>0$, $a+b\leq2$, $0<c-10$, $0<y<24$. $0<z<17$; $Si_aSn_bC_cO_yN_zX_n$ and $Si_aSn_bO_yN_zX_n$ where $X_n$ is at least one of the elements F, Cl, Br, I, S, Se, Te, P, As, Sb, Bi, Ge, Pb.
 (iii) $Si_xN_y$ type nitrides (particularly in which $x=3$ and $y=4$), $Sn_xN_y$ (particularly in which $x=3$ and $y=4$), $Zn_xN_y$ (particularly in which $x=3$ and $y=4$), $Li_{3-x}M_xN$ (where M=Co, Ni, Cu);
 (iv) $SnO_2$, $Li_4Ti_5O_{12}$, $SnB_{0.6}P_{0.4}O_{2.9}$. oxides The anode or cathode can be made by adding nanoparticles of electron conducting materials to the materials mentioned above, and particularly graphite, and/or nanoparticles of lithium ion conducting materials of the type used to make electrolyte films. Some electrode materials are bad ion and electrical conductors, consequently when the deposited thicknesses are greater than 0.5 μm, the electrode may be too resistive and not function any longer. Thicknesses of 1 to 10 μm are usually required for electrodes, so as to have batteries with good energy densities. In this case a co-deposit of electrode material particles and conducting particles (ion and/or electrical) is required.

If the anode film is deposited by a process other than electrophoresis, it is preferably done by vacuum deposition, and the deposited material is preferably lithium or a lithium alloy.

The electrolyte must be a good ion conductor and an electrical insulator. According to the invention, the nanoparticles used to make the electrolyte thin film are preferably chosen from among one or several of the following materials:
 (i) lithium compounds based on lithium and phosphorus oxinitrides (called LiPON) in the form $Li_xPO_yN_z$ where $x\sim2.8$ and $2y+3z\sim7.8$ and $0.16\leq z\leq0.4$, and in particular $Li_{2.9}PO_{3.3}N_{0.46}$, but also all variants in the form $Li_wPO_xN_yS_z$ where $2x+3y+2z=5=w$ and $3.2\leq x\leq3.8$, $0.13\leq y\leq0.4$, $0\leq z\leq0.2$, $2.9\leq w\leq3.3$ or in the form $Li_tP_xAl_yO_uN_vS_w$ where $5x+3y=5$, $2u+3v+2w=5+t$, $2.9\leq t\leq3.3$, $0.94\leq x\leq0.84$, $0.094\leq x\leq0.26$, $3.2\leq u\leq3.8$, $0.13\leq v\leq0.46$, $0\leq w\leq0.2$;
 (ii) lithium compounds based on lithium, phosphorus and silicon oxinitride (called LiSiPON), and particularly $Li_{1.9}Si_{0.28}P_{1.0}O_{1.1}N_{1.0}$;
 (iii) lithium oxinitrides of the LiBON, LiBSO, LiSiPON, LiSON, thio-LiSiCON, LiPONB types (where B, P and S represent boron, phosphorus and sulfur respectively);
 (iv) $La_{0.51}Li_{0.34}Ti_{2.94}$, $Li_{3.4}V_{0.4}Ge_{0.6}O_4$, $Li_2O-Nb_2O_5$, $LiAlGaSPO_4$ compounds; formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where $0<x<1$), $Li_{1+x+y}Al_xTi_{2-x}Si_yP_{3-y}O_{12}$ (where $0\leq x\leq1$ and $0\leq y\leq1$), $Li_{1+x+z}M_x(Ge_{1-y}Ti_y)_{2-x}Si_zP_{3-z}O_{12}$ (where $0\leq x\leq0.8$; $0\leq y\leq1.0$; $0\leq z\leq0.6$), and particularly formulations 4.9LiI-34, $1Li_2O$-$61B_2O_3$, $0.30Li_2S$-$0.26B_2S_3$-$0.44LiI$, $60Li_2S$-$40SiS_2$, $0.02Li_3PO_4$-$0.98(Li_2S-SiS_2)$, $2(Li_{1.4}Ti_2Si_{0.4}P_{2.6}O_{12})$-$AlPO_4$, $0.7Li_2S$-$0.3P_2S_5$.

Once the required chemical composition (i.e. the nature of the powder or powder mixes) has been defined, the nanoparticles are put into solution in an appropriate liquid phase. A stabilizer is added in some embodiments, in order to obtain a suspension for which the zeta potential is preferably greater than 40 mV, and even more preferably more than 60 mV.

However, advantageously, the suspensions used do not contain any stabilizers, and particularly have low contents of dry extracts (usually less than 10 g/L), and especially they contain particles smaller than 100 nm and preferably smaller than 50 nm. In this case, the Zeta potential of the suspension is usually between 25 and 40 mV.

For example, the solvents used can be based on ketone, alcohol or a mix of the two.

Steric stabilizers that could be used include particularly polyethylene imine (PEI), polyacrylic acid (PAA), citric acid and nitrocellulose provided that they are soluble in the chosen organic solvent.

Electrostatic stabilizations may be made by adding iodide, by adding acids or bases. The solution may be acidified or basified by the addition of traces of water and acids when the suspension is made in a solvented phase.

The electrical conductivity of the suspension may be controlled to obtain a large potential gradient between the two electrodes without any risk of dielectric breakdown.

Preferably, the conductivity of the colloidal suspension is between 1 and 20 μS/cm. Small quantities of strong acids and bases can be added to control the conductivity of the suspension and charge particle surfaces.

It may be necessary to perform a powder grinding and/or dispersion step before the nanoparticles are put into suspension, to de-agglomerate the particles and possibly adjust their size (to obtain an average size smaller than 100 nm or even less than 30 nm) and reduce the size dispersion, so as to obtain a stable suspension with cluster-free nanometric sized particles. Ultrasounds may also be used to assist in deagglomeration and putting particles into suspension.

Defects created in particles during the grinding and dispersion steps can also reduce the consolidation temperature, in the same way as when mechanical compressions are performed.

Electrophoretic Deposition of Films

According to the invention, at least the cathode film and the electrolyte film are deposited electrophoretically. The electrophoretic deposition of particles is made by application of an electric field between the substrate on which the deposit is made and the counter electrode, in order to move the charged particles in the colloidal suspension and to deposit them on the substrate. The lack of binders and other solvents deposited on the surface with the particles can result in very compact deposits. The compactness obtained due to electrophoretic deposition and the lack of any large quantities of organic compounds in the deposit can limit or even prevent risks of crazing or the appearance of other defects in the deposit during drying steps.

Furthermore, due to the fact that the deposit obtained by electrophoresis does not contain any binders or other organic compounds, the process according to this invention does not require any burning or evaporation steps of corrosive or noxious compounds. The increase in economic and environmental constraints makes it necessary to reduce releases into the atmosphere and this invention thus satisfies these constraints.

Furthermore, burning of these organic compounds tends to create empty zones, cavities in the deposit that will subsequently be difficult to fill. These unbinding steps can also lead to pollution of the surfaces of deposited particles.

Furthermore, the deposition rate can be very high depending on the applied electric field and the electrophoretic mobility of particles in suspension. For an applied voltage of 200 V, deposition rates of the order of 10 μm/min can be obtained.

FIG. 3 shows the operating principle of deposition by electrophoresis.

The inventor has observed that this technique can be used to make deposits on very large areas with excellent uniformity and very high precision (provided that particle concentrations and electric fields are uniform over the surface of the substrate). This technique can also be used to cover three-dimensional surfaces.

The thickness of each cathode, anode and solid electrolyte film is preferably between 1 μm and 10 μm.

A mechanical consolidation step (for example by pressing) can be carried out after deposition of the film and before the heat treatment sintering step if there is one, in order to further compact particles and induce particle deformations that will further simplify subsequent consolidation.

Deposition by electrophoresis may be applied in a "batch" (static) type process or in a continuous process.

During the electrophoretic deposition, a stabilized power supply can be used to apply a voltage between the conducting substrate and a counter electrode located in the colloidal suspension.

This voltage may be direct or alternating. Precise monitoring of the currents obtained helps to monitor the deposited thicknesses and to control them precisely. When the deposited films are insulating, their thickness affects the value of the electric field and in this case, a controlled current deposition mode is preferred. The value of the electric field is modified depending on the resistivity of the interface.

This deposition technique also enables perfect coverage of the surface regardless of its geometry and the presence of roughness defects. Consequently, it can guarantee dielectric properties of the electrolyte film.

When materials that do not conduct electricity or conduct electricity only slightly are deposited on the surface of a substrate, any zones that are not so well coated conduct better and thus locally concentrate a higher deposition rate that tends to compensate or even eliminate the defect. The intrinsic quality of the deposits obtained is thus excellent, there are very few defects and the deposits are very homogeneous.

The diagram in FIG. 4 shows a typical embodiment of the process according to the invention, in this case shown for each of the films:

Step 1: Preparation of suspensions. The powders used have the chemical composition of the coating (thin film) that is to be deposited.

Step 2: Immersion of the substrate in the colloidal suspension. The colloidal suspension can cover the entire surface of the substrate. In one particular embodiment, a stencil can be applied to the surface of the substrate so as to limit the area in contact with the suspension, consequently reducing the area of the deposit.

Step 3: Application of an electric field between the substrate and a counter electrode located in the colloidal suspension. This electric field can be constant and/or variable (alternating). The average direction of the electric field, in other words the potential applied to the electrodes, is adapted to the charge of the particle to be deposited (cataphoresis or anaphoresis).

Step 4: Drying. Drying conditions depend on the deposited thickness and the nature of the solvent.

A mechanical consolidation step can be made on the wet film before drying, for example by calendering or static compression; this can improve the quality of the film, but does not replace dry consolidation.

Step 5: Consolidation. Consolidation is done by mechanical consolidation and/or heat treatment.

Consolidation may also be done after deposition of each new film on several films at the same time.

FIG. 5 shows another embodiment of the process according to the invention.

Consolidation of the Deposit

Advantageously, deposited films are consolidated to reduce the porosity of the coating. This consolidation step of the deposit can be done:

- by a mechanical means, particularly by isostatic pressing. The applied pressure in some embodiments is more than 250 MPa or even more than 400 MPa. However, advantageously, the applied pressure is between 30 and 100 MPa, and preferably between 40 and 60 MPa.
- by heat treatment. The temperature depends closely on the chemical composition of the deposited powders. Depending on the nature of the deposited materials, it may also be useful to maintain a controlled atmosphere to prevent oxidation of the coating;

by a combination of thermal and mechanical means, and particularly by high pressure sintering;

The substrate is composed of an insulating material with metalized and generally conducting zones. It is preferred to avoid heating it to high temperatures during fabrication of the battery, to prevent any risk of oxidation and deterioration of surface properties. The reduction in surface oxidation is particularly beneficial to reduce electrical contact resistances, which is an essential point in operation of energy storage and/or production devices.

Very high quality electrophoretic films like those described above and particularly compact films, can reduce the heat treatment duration and temperature and limit shrinkage related to these treatments, to obtain a homogeneous nanocrystalline structure. This contributes to obtaining dense films with no defects.

The inventor has observed that the heat treatment temperature can be reduced if the size of deposited particles is reduced. Thus, thin or relatively thick film deposits can be made with porosity of less than 10%, preferably less than 5% or even 2%, without needing to apply high temperatures and/or long heat treatment times. Furthermore, this compaction technology for low temperature deposits considerably reduces risks of shrinkage. Thus, it is no longer necessary to use highly complex and expensive heat treatment cycles to consolidate battery electrode and electrolyte deposits.

During the mechanical and/or thermal consolidation phase, it can be advantageous to work under a vacuum or under an inert atmosphere to prevent the appearance of pollution on particle surfaces that could be harmful to the consolidation mechanism of particles among each other.

For particle sizes like those used in the process according to the invention, the increase in surface energies becomes the main driving force of consolidation by heat treatment; this results in a large reduction in consolidation temperatures when the particle size reduces. However, if this reduction in consolidation temperatures is to be effective, it is necessary for particles to be firstly mechanically compacted and/or deposited with compact stacking The multiplication of mechanical contacts between these particles facilitates diffusion processes that cause consolidation. Thus, pressing is usually applied to compact deposits.

The presence of clusters and inter-cluster cavities also has an influence on consolidation. As cavity sizes increase, the diffusion distance also increases and the consolidation temperature necessary to obtain good consolidation increases.

Thus, with nanoparticles deposited by electrophoresis, it is possible to approach the theoretical geometric density of a compact stack of spheres (74%), without a mechanical compaction step.

Such a result is not possible using inking techniques. Deposition of nanoparticles using the ink technique mentioned above is very difficult with thin films because the reduction in particle size increases the viscosity of suspensions. Thus, the dry extract has to be reduced by increasing the proportion of solvent; in this case, pores and cavities are induced when much of the solvent is eliminated from the raw films, and it is practically impossible to fill them without the use of extreme temperatures and/or pressures.

The high compactness of the deposit obtained by electrophoresis and the small quantity of solvent to be evaporated very significantly reduce the risk of appearance of cracks after drying. Furthermore, the small size of particles and their large specific area tend to facilitate consolidation steps by heat treatment (often called "sintering" in this context).

The deposit can thus be consolidated at temperatures equal to approximately $0.7T_f$, or even $0.5T_f$ or $0.3T_f$ where $T_f$ is the melting temperature (expressed in ° C.) of the solid material with chemical composition identical to that of the deposited particle. The "melting temperature" term in this case refers to the decomposition temperature for the case of substances for which there is no melting point.

When the film is composed of a mix of materials, the heat treatment temperature is chosen relative to the melting temperature of the material with the lowest melting temperature. Mechanical compression can also be applied to this deposit in order to further reduce this consolidation temperature, in order to further increase its compactness and/or create isolated defects that will contribute to accelerating the consolidation process and obtaining thin films with no pores.

Such a process for the fabrication of thin films can be used directly on substrates such as metalized polymers, aluminum foil with low melting temperatures.

However, since nanoparticles are very sensitive to surface pollution, it is preferable to perform these consolidation treatments under a vacuum or under an inert atmosphere.

FIG. 2a shows procurement of a substrate, in this case in the form of an insulating plate 65 coated partially with metal films 68a, 68b corresponding to a main embodiment of the invention. FIG. 2b shows electrophoretic deposition of nanoparticles of the cathode 63 on the metal part of the substrate 68a. FIG. 2c shows the electrophoretic deposition of nanoparticles of the electrolyte 66 on the metal part of the substrate 68a covered by the cathode 63.

FIG. 2d shows a sectional view of the battery after deposition of the anode thin film.

In this example, the anode is obtained by evaporation of a metal lithium film that acts as anode and also makes the electrical contract with the anode current collector deposited on the substrate.

FIG. 3 shows the sectional view of the process for electrophoretic deposition of nanoparticles 30 of cathode material contained in a colloidal suspension 42 around an insulating stencil 46 on a substrate 44 with a metalized surface 45. Charged particles 31 are deposited under the effect of an electric field generated by the voltage source 47 on the metalized surface 45 of the substrate 44. This figure shows the operating principle of electrophoretic depositions, and also corresponds to the embodiment shown in FIG. 2b.

FIG. 5 shows a step by step view of another example embodiment derived from that shown in FIG. 2, but in which the anode film 21 is not metal, but is made for example of $Li_4Ti_5O_{12}$. A connection wire 25 makes the electrical connection between the anode collector 13, typically a metal film deposited on the anode film 21, and a metal deposit 28 providing the electrical termination on which the current can be transferred (for example by mechanical contact or by soldering with a metal element) to the consuming component, the second contact possibly being connected to the metal film 23 acting as the cathode current collector.

FIG. 6a shows the lithium diffusion path in a compact stack of particles impregnated with electrolyte. There is a surface contact zone 76 between the particles and the electrolyte contained in the pores. The diffusion path is only slightly resistive. There is also a point contact zone 77 between particles. Lithium diffusion on this point contact is limited.

FIG. 6b shows the development of the interface between the particles during consolidation. The diffusion path 78 can be achieved in the solid-state phase without the use of a liquid electrolyte in the pores.

FIG. 6c shows the structure obtained after consolidation of a composite deposit containing a "meltable" phase 79.

FIG. 6d diagrammatically shows the influence of consolidation on the type of porosity. This point can justify how the porosity of our batteries is less than 30%. At this level, pores are closed and can no longer be impregnated with electrolyte.

The performances (Wh/l, Wh/kg) of a thin film battery are better when the porosity is low.

Electrophoresis makes it possible to deposit films with compositions that are difficult or even impossible to obtain by a vacuum process; for example, polymers can be added into a mineral phase, or deposits of spinel ($LiMn_2O_4$), olivine ($LiFePO_4$) type compounds that are difficult to achieve by vacuum deposition, can be made.

Note that if the cathode or electrolyte consolidation is done before the electrophoretic deposition of the next film (in fact electrolyte or anode), there is a risk that lithium migrates to the surface on which the electrophoretic deposit is made; the potential applied to the electrolyte film in particular to electrophoretically deposit the anode film is very much higher than the charge potential of the battery formed, which can destroy the formed battery.

Consequently, the surface charge of the particles to be deposited should be adapted, as should the direction of the electric field to prevent any migration of lithium ions from the deposited thin films.

Micro-batteries that can be obtained using the process according to the invention are different from known batteries in several structural ways. The electrolyte is entirely solid. The films can have a composition that cannot be obtained by vacuum deposition. The porosity of anode, cathode and solid electrolyte films, expressed by the ratio between the real density and the theoretical density of the films, is high and can reach 0.9 or even 0.95. The grain size can be much lower than in thin film batteries in which films are deposited by inks, because the film deposited by electrophoresis is more compact and can be consolidated at low temperature.

Advantageously, in batteries according to the invention, all the collectors are made of aluminum which is less expensive than copper or silver; it is also lighter in weight. It is often impossible to use aluminum in batteries according to the state of the art, or the use of aluminum is limited to the cathode, either because their fabrication requires excessively high temperatures compared with the melting point of aluminum, or because an aluminum anode could be attacked by lithium salts deposited on it. The fact that a single material is used for the collectors in a particular battery facilitates recycling. Advantageously, the collectors are made of aluminum foil or sheets; this foil or these sheets can be treated by electro-polishing in order to reduce their thickness and smooth their surface. They may be nickel-plated to prevent the formation of a resistive oxide layer on the aluminum surface.

Another structural characteristic of batteries according to the invention is that the electrolyte film covers the edge of the anode and cathode films, at least on one side.

One final structural characteristic of batteries according to the invention is their dimensional stability during use: with some anode materials (particularly $Li_4Ti_5O_{12}$) that are difficult to achieve by vacuum deposition, insertion of lithium does not cause any change in the thickness. This extends the life of batteries, particularly batteries manufactured by stacking several "collector/anode/electrolyte/cathode/collector" structures.

The invention has many advantages. The process for fabrication of anode, solid electrolyte and cathode films by electrophoresis is simple, fast and inexpensive. The process does not have to be used in a dry atmosphere, unlike processes according to the state of the art making use of lithium salts or metal lithium that are very sensitive to humidity. The batteries obtained have a high power density; they also have a high energy density (about twice as high as known lithium ion batteries) due to the very low porosity and the thinness of electrolyte films. The lack of corrosive lithium salts in electrolytes and the possibility of replacing metal lithium-based anodes with insertion materials extends the life of the battery, reduces the risk of an internal short circuit and also increases its resistance to temperature; consequently, batteries according to the invention can be wave-soldered. Thus, batteries according to the invention are safer. Furthermore, their self-discharge rate is lower because the electrolyte film has no defects or porosity and covers the edges of the electrodes.

The process according to the invention can be implemented as follows. The following examples are given for illustration and do not limit the scope of the invention.

EXAMPLE 1

Fabrication of a Battery

1—Preparation of the SP+ Colloidal Suspension

A $LiMn_2O_4$ powder composed of clusters of nanoparticles is synthesized to obtain the SP+ suspension of P+ particles for the cathode material. This is done using Pechini's process described in the article "*Synthesis and Electrochemical Studies of Spinel Phase $LiMn_2O_4$ Cathode Materials Prepared by the Pechini Process*", W. Liu, G. C. Farrington, F. Chaput, B. Dunn, J. Electrochem. Soc., vol. 143, No. 3, 1996. After the calcination step at 600° C., the powder contains clusters with a size of between 50 nm and 100 nm.

This powder is then put into suspension in ethanol with a dry extract of $LiMn_2O_4$ equal to 20 g/l.

The SP+ suspension is poured into the bowl of a ball grinder previously filled with 0.1 mm diameter ceramic balls. Grinding takes place for 2 hours in the presence of a few hundred ppm of a complexing agent, for example polyacrylic acid, to obtain a colloidal solution with particles ($D_{50}$) with a size equal to 10 nm. The zeta potential of the suspension is equal to about 65 mV.

2—Deposition of the Cathode Film

The $LiMn_2O_4$ particles contained in the suspension are then deposited on the metalized area of the substrate (see FIG. 2b). The deposition is made locally using an insulating stencil (see FIGS. 2b and 3). The deposition is made by applying a voltage of 100 V between the metalized area of the substrate on which the deposit is made and a counter electrode, both immersed in the colloidal suspension, until a 5 μm thick deposit is obtained. The deposit is then dried for 1 hour at 90° C.

The deposit is then compacted by a compression and then annealed at 500° C. for 900 seconds.

3—Preparation of the SPn Colloidal Suspension

The first step in making the colloidal suspension containing electrolyte particles is to synthesize nanometric powders of $Li_{1.3}Al_{0.3}Ti_{1.7}(PO_4)_3$ using the process described in the "*Thin-film lithium-ion battery derived from $Li_{1.3}Al_{0.3}Ti_{1.7}(PO4)$ sintered pellets*" publication by Xiao et al, published in Trans. Nonferrous Me. Soc. China 16 (2006), p. 281-285. Stoechiometric quantities of $Li(CH_3—COO).2H_2O$ and $Al(NO_3)_3.9H_2O$ are dissolved in $CH_3OCH_2CH_2OH$, and $PO(OC_4H_9)_4$ is then added to this mixture while stirring.

After adding the stoichiometric quantity of demineralized water for hydrolysis of alkoxides, the suspension obtained is dried at 140° C. for 4 hours to form an $Li_{1.3}Al_{0.3}Ti_{1.7}(PO_4)_3$ gel. This gel is then calcinated at 900° C. for 2 hours to obtain an agglomerated powder of $Li_{1.3}Al_{0.3}Ti_{1.7}(PO_4)_3$; this powder is then put into suspension in ethanol at a concentration equal to 20 g/l.

The suspension is added into the bowl of a ball grinder previously filled with 0.1 mm diameter ceramic balls. Grinding for 3 hours in the presence of a small quantity of polyacrylic acid that acts as a complexing agent results in a colloidal solution with particles with size $D_{50}$ equal to 15 nm. The zeta potential of the suspension is of the order of 60 mV.

4—Deposition of the Electrolyte Film

The $Li_{1.3}Al_{0.3}Ti_{1.7}(PO_4)_3$ particles obtained in the suspension are subsequently deposited on the consolidated deposit of $LiMn_2O_4$, by applying a voltage of 100 V between the substrate and a counter electrode both immersed in the colloidal suspension, until a 1.5 μm thick deposit is obtained.

The cathode ($LiMn_2O_4$) is coated with a thin film of electrolyte nanoparticles. The electrolyte film is dried at 90° C.

The deposit is then compacted by compression and then annealed at 350° C. for 900 seconds.

5—Deposition of the Anode Film

The substrate with the cathode and electrolyte deposits is then placed in a vacuum chamber, and the lithium anode is deposited locally on a surface covering the surface facing the cathode and the electrical termination deposited on the substrate, on the electrolyte.

When a metal lithium anode is used, an encapsulation film must be deposited to protect the battery cell from external aggression.

EXAMPLE 2

Fabrication of an Anode Film

1—Preparation of the Substrate

A 15 μm thick aluminum foil is procured. The foil is then placed in an unwinder and is placed on a support frame, so as to create a rigid support structure for the aluminum foil without creasing the foil. This support frame is designed with an insulating external surface with the presence of electrical contacts on the internal surfaces. These internal conducting surfaces are in contact with the aluminum foil and impose a potential on it. The aluminum foil in its frame is then immersed in a surface cleaning bath. This cleaning is done by immersion in a bath of detergent made by NGL technologie under ultrasounds followed by rinsing with distilled water.

Once the surface was cleaned, we performed an electro-polishing treatment in a solution with chemical composition equal to 80% absolute ethanol, 13.8% distilled water and 6.2% perchloric acid at 70%. The aluminum was electro-polished at a polarization under 15V with a lead counter electrode. The treatment bath was cooled to prevent overheating due to high current densities. Other bath formulations may be used for a better surface quality, for example baths based on EPS 1250 or EPS 1300 type solutions supplied by EP-Systems.

After the electro-polishing treatment, the surface was rinsed with distilled water.

2—Preparation of an SP− Colloidal Suspension

This colloidal suspension was made without the addition of stabilizers, to guarantee an excellent purity of the electrode. We did this by preparing a colloidal suspension of $Li_4Ti_5O_{12}$ in alcohol by grinding and dispersing $Li_4Ti_5O_{12}$ nanoparticles.

$Li_4Ti_5O_{12}$ nanoparticles were purchased from Aldrich, and then ground in ethyl alcohol at a concentration of 10 g/l. After this grinding-dispersion step, the suspension was ultrasonically irradiated and then allowed to settle. We drew off only the float of the suspension after settlement in order to be sure of obtaining a colloidal suspension of nanoparticles with no clusters larger than 100 nm.

A suspension was thus obtained containing no stabilizer. We observed that the stability of nanocolloids depended largely on the particle size and their concentration in the suspension. When the particle size is close to about ten nanometers, particles can be stable in suspensions without any added stabilizers. The high specific area of these particles and their low mass are such that interactions result in making the system behave like a real gas that can condense resulting in a colloidal crystal. Electrophoretic depositions of these nanoparticles result in condensation of this so-called colloidal crystal phase on the surface of the substrate.

3—Deposition of the Anode Film

A thin film of $Li_4Ti_5O_{12}$ particles was deposited by electrophoresis on the electro-polished aluminum foil obtained in step 1 above.

The deposition conditions used were 10V/cm, which gave a compact deposi about 0.5 μm thick after only thirty seconds of anaphoresis.

The deposit was then annealed at 500° C. for 1 hour and then pressed at 50 MPa.

The result obtained was an anode.

A cyclic voltammetry curve was then plotted on this electrode at 0.1 V/sec in order to validate its insertion properties with regard to lithium ions. FIG. 23a shows an illustration of the curve thus obtained.

EXAMPLE 3

Fabrication of an Anode Film

The substrate is the same as that shown in example 2.

The preparation process for the suspension of SP− particles is similar to that used in example 2, except that the suspension of $Li_4Ti_5O_{12}$ particles was diluted to 2 g/l and that citric acid was added to the suspension at a concentration of 1×10-3 M. The suspension was ultrasonically irradiated and the float was retrieved after settlement.

SP− particles were deposited under the same conditions as in example 2. The deposit was then dried and then consolidated at 50 MPa.

A cyclic voltammetry curve was then plotted on this electrode at 0.1 V/sec in order to validate its insertion properties with regard to lithium ions. The curve is shown in FIG. 23b.

The electrode thus obtained is entirely solid and adheres to the substrate without the addition of PVDF type binders in the deposit.

EXAMPLE 4

Fabrication of a Cathode Film

1—Preparation of a Colloidal Suspension of SP+ Particles

Nanometric powders of $LiMn_{1.5}Ni_{0.4}Cr_{0.1}O_4$ were synthesized using the method described below: Small quantities of $Li_2CO_3$ powder are dissolved in a mix of citric acid and ethylene glycol heated to 70° C. A release of $CO_2$ is observed for each added portion. The temperature of the mixture is increased to 90° C., and stoechiometric quantities of $Mn(NO_3)_2.4H_2O$, $Ni(NO_3)_2.6H_2O$ and $Cr(NO_3)_2.9H_2O$ are added to this final solution and the temperature of the mixture is then increased to 140° C. to obtain a hard bubbled mass. This mass is then placed in the drying oven at 250° C. until a powder is obtained. The powder obtained is then calcinated at 800° C. for 6h. These nanopowders were ground and dispersed in alcohol to obtain a 20 g/l suspension of $LiMn_{1.5}Ni_{0.4}Cr_{0.1}O_4$. Grinding-dispersion was performed until the size of particles in suspension was 30 nm. This suspension was then diluted in a solvent with a ketone-type base to obtain a 5 g/l suspension.

EXAMPLE 5

Fabrication of an Electrolyte Film

1—Preparation of a Colloidal Suspension of SPn Particles

The first step to make the colloidal suspension containing the electrolyte particles is to synthesize nanometric particles of $Li_{1.3}Al_{0.3}Ti_{1.7}(PO_4)_3$ using the process described in the publication "Thin-film lithium-ion battery derived from $Li_{1.3}Al_{0.3}Ti_{1.7}(PO_4)_3$ sintered pellets" by Xiao et al., published in Trans. Nonferrous Me. Soc. China 16 (2006), p. 281-285.

The nanometric $Li_{1.3}Al_{0.3}Ti_{1.7}(PO_4)_3$ powders were put into colloidal suspension in ethyl alcohol by grinding-dispersion. No stabilizer was added to the colloidal suspension which had a dry extract of 10 g/l. The suspension thus obtained was perfectly stable.

The size grading distribution of nanoparticles in colloidal suspensions was determined by DLS (Dynamic Light Scattering), also called photon correlation spectroscopy with a commercial Zetasizer apparatus made by Malvern Instruments. The measurement principle is based on Brownian motion of particles in suspension. This measurement technique quantifies the diffusion rate of particles in solution, to deduce their hydrodynamic radius. DLS measurements shown in FIG. 8 illustrate the size distribution of particles in suspension.

The average size of particles in suspension is 60 nm. As before, we worked almost exclusively with floats of suspensions after settlement, to be sure of not drawing off any clusters.

EXAMPLE 5

All-Solid-State Thin Film Battery With an All-Aluminum Collector

1—Fabrication of the Cathode:

We made an anaphoretic deposition of $LiMn_{1.5}Ni_{0.4}Cr_{0.1}O_4$ nanoparticles from the colloidal suspension of $LiMn_{1.5}Ni_{0.4}Cr_{0.1}O_4$ nanopowders prepared in example 2-a above, on an aluminum substrate with an initial thickness of 15 μm that was thinned and the surface of which was smoothed and pickled by electro-polishing. The deposition conditions used were 90V/cm, which gives a deposit of about one micron after only a few seconds of anaphoresis.

This deposit was then dried and consolidated by heating at uniaxial pressure.

2—Fabrication of the Anode:

We made a colloidal suspension of $Li_4Ti_5O_{12}$ nanoparticles and carbon black nanoparticles without the addition of stabilizers to guarantee an electrode with excellent purity. This suspension was prepared in alcohol by grinding-dispersion of $Li_4Ti_5O_{12}$ and carbon nanoparticles. The $Li_4Ti_5O_{12}$ nanoparticles were purchased from the Aldrich Company, the Ketjenblack type carbon black nanoparticles from Akzo Nobel, they were then ground together in ethyl alcohol at a concentration of 10 g/l. The suspension was subjected to ultrasounds after this grinding-dispersion step, and was allowed to settle. We drew off only the float of the suspension after settlement in order to be sure of obtaining a monodispersed colloidal suspension of nanoparticles with no clusters larger than 100 nm.

We started from this colloidal suspension to make an anaphoretic deposition of nanoparticles contained in the suspension on an aluminum substrate with an initial thickness of 15 μm that was thinned and the surface of which was smoothed and pickled by electro-polishing. The deposition conditions used were 10V/cm, which gave a deposit of slightly less than one micron after a few seconds of anaphoresis.

This deposit was then dried and consolidated by heating under uniaxial pressure.

3—Assembly of the Battery Cell:

The two electrodes were then covered with a thin electrolyte film deposited by electrophoresis from the suspension described in FIG. 2-b. This film of $Li_{1.3}Al_{0.3}Ti_{1.7}(PO_4)_3$ nanoparticles was obtained under a field of 10V/cm for 30 seconds.

The two half-electrodes covered with the thin film of electrolyte nanoparticles are then assembled by applying the two faces of each of the electrodes together covered with electrolyte and then applying a heat treatment to them at 300° C. under uniaxial pressure.

We thus made an all-solid-state thin film battery with an all-aluminum collector.

EXAMPLE 6

Synthesis of Nanoparticles that can be Used as Anaode and Cathode Materials a) $LiMn_{1.5}Ni_{0.4}Cr_{0.1}O_4$ Small quantities of $Li_2CO_3$ powder are dissolved in a mixture of citric acid and ethylene glycol heated to 70° C. A release of $CO_2$ is observed for each added portion. The temperature of the mixture is increased to 90° C., and stoechiometric quantities of $Mn(NO_3)_2.4H_2O$, $Ni(NO_3)_2.6H_2O$ and $Cr(NO_3)_2.9H_2O$ are added to this final solution and the temperature of the mix is then increased to 140° C. until a hard bubbled mass is obtained. This mass is then placed in the drying oven at 250° C. until a powder is obtained. The powder obtained is then calcinated at 800° C. for 6 h. The powder obtained can be used to prepare cathode films in Li-ion type batteries.

b) $LiMnPO_4$

Stoechiometric quantities of an $Li_3PO_4$ powder and an $MnSO_4.4H_2O$ powder are ground in a mortar. The ground powder obtained is placed in an autoclave at 190° C. for 12 h. The product obtained is washed, centrifuged and then dried at 40° C. for one night. The powder obtained can be used to prepare cathode films in Li-ion type batteries.

c) $LiFePO_4$

Stoechiometric quantities of an $Li_3PO_4$ powder and an $FeSO_4.7H_2O$ powder are ground in a mortar. The ground powder obtained is placed in an autoclave at 190° C. for 12h. The product obtained is washed, centrifuged and then dried at 40° C. for one night. The powder obtained can be used to prepare cathode films in Li-ion type batteries.

d) $Li_{2.9}PO_{3.3}N_{0.36}/Li_{2.9}PO_{3.3}N_{0.46}$ (LIPON)

A nanometric $Li_3PO_4$ powder that has not received any high temperature heat treatment is placed in an alumina scoop placed in a tubular furnace. The powder is then heat treated at 650° C. for 2 h under an ammonia atmosphere. The powder thus obtained can be used to prepare electrolyte films in Li-ion type batteries.

The invention claimed is:

1. A process for fabrication of an all-solid-state thin film micro-battery, the process comprising:
    depositing, by electrophoresis as one of a cathode film or an anode film, a first electrode film without any binders on one of a conducting substrate or a substrate with at least one conducting zone, said substrate or said at least one conducting zone serving as a collector of current from said first electrode film;
    depositing an electrolyte film by electrophoresis from a suspension containing nanoparticles of electrolyte materials on said first electrode film, the electrolyte film; and
    depositing, by one of electrophoresis or a vacuum deposition process as one of a cathode film or an anode film, a second electrode film on the electrolyte film to form the all-solid-state thin film micro-battery; and
    consolidating the films deposited by electrophoresis to increase the density thereof of the films deposited by electrophoresis,
    wherein:
        the first electrode film is deposited from a suspension containing nanoparticles of one of cathode materials in a cathode materials suspension or anode materials in an anode materials suspension,
        the second electrode film is deposited from a suspension containing nanoparticles of one of cathode materials in a cathode materials suspension or anode materials in an anode materials suspension,
        an average size of nanoparticles in at least one of the cathode material in the cathode materials suspension, the electrolyte material in the electrolyte materials suspension, and the anode material in the anode materials suspension is less than 100 nm,
        said films deposited by electrophoresis have a porosity of less than 5%.

2. The process of claim 1, wherein consolidating the films deposited by electrophoresis is conducted after depositing at least one of the cathode film and the electrolyte film, when the anode film is deposited using a technique other than electrophoresis.

3. The process of claim 1, wherein consolidating the films deposited by electrophoresis is conducted after depositing the anode film, when the anode film is deposited by electrophoresis.

4. The process of claim 1, wherein consolidating the films deposited by electrophoresis comprises conducting, under a vacuum or an inert gas, at least one of a mechanical consolidation or a thermal consolidation of the films deposited by electrophoresis.

5. The process of claim 1, wherein consolidating the films deposited by electrophoresis comprises conducting at least one of a mechanical consolidation or a thermal consolidation of the films deposited by electrophoresis.

6. The process of claim 5, wherein the thermal consolidation is conducted at a temperature that does not exceed 0.7 times a melting or decomposition temperature of the anode film, the cathode film, or the electrolyte film, with a lowest melting temperature to which the thermal consolidation being applied.

7. The process of claim 5, wherein said thermal consolidation is conducted at a temperature that does not exceed 0.5 times the melting or decomposition temperature of the anode film, the cathode film, or the electrolyte film, with the lowest melting temperature to which the thermal consolidation being applied.

8. The process of claim 5, wherein said thermal consolidation is conducted at a temperature that does not exceed 0.3 times the melting or decomposition temperature of the anode film, the cathode film, or the electrolyte film, with the lowest melting temperature to which the thermal consolidation being applied.

9. The process of claim 5, wherein the thermal consolidation is conducted at a temperature that does not exceed 600° C.

10. A process for fabrication of an all-solid-state thin film micro-battery, the process comprising:
    depositing, by electrophoresis as one of a cathode film or an anode film, a first electrode film without any binders on one of a conducting substrate or a substrate with at least one conducting zone, said substrate or said at least one conducting zone serving as a collector of current from said first electrode film;
    depositing an electrolyte film by electrophoresis from a suspension containing nanoparticles of electrolyte materials on said first electrode film, the electrolyte film; and
    depositing, by one of electrophoresis or a vacuum deposition process as one of a cathode film or an anode film, a second electrode film on the electrolyte film to form the all-solid-state thin film micro-battery; and
    consolidating the films deposited by electrophoresis to increase the density of the films deposited by electrophoresis,
    wherein:
        the first electrode film is deposited from a suspension containing nanoparticles of one of cathode materials in a cathode materials suspension or anode materials in an anode materials suspension,
        the second electrode film is deposited from a suspension containing nanoparticles of one of cathode materials in a cathode materials suspension or anode materials in an anode materials suspension,
        an average size of nanoparticles in at least one of the cathode material in the cathode materials suspension, the electrolyte material in the electrolyte materials suspension, and the anode material in the anode materials suspension is less than 100 nm,
        said films deposited by electrophoresis have a porosity of less than 20%.

11. A process for fabrication of an all-solid-state thin film micro-battery, the process comprising:
    depositing, by electrophoresis as one of a cathode film or an anode film, a first electrode film without any binders on one of a conducting substrate or a substrate with at least one conducting zone, said substrate or said at least one conducting zone serving as a collector of current from said first electrode film;
    depositing an electrolyte film by electrophoresis from a suspension containing nanoparticles of electrolyte materials on said first electrode film, the electrolyte film; and
    depositing, by one of electrophoresis or a vacuum deposition process as one of a cathode film or an anode film, a second electrode film on the electrolyte film to form the all-solid-state thin film micro-battery; and consolidating the films deposited by electrophoresis to increase the density of the films deposited by electrophoresis, wherein:
the first electrode film is deposited from a suspension containing nanoparticles of one of cathode materials in a cathode materials suspension or anode materials in an anode materials suspension, the second electrode film is deposited from a suspension containing nanoparticles of one of cathode materials in a cathode materials suspension or anode materials in an anode materials suspension, an average size of nanoparticles in at least one of the cathode material in the cathode materials suspension, the electrolyte material in the electrolyte materials suspension, and the anode material in the anode materials suspension is less than 100 nm, said films deposited by electrophoresis have a porosity of less than 10%.

* * * * *